United States Patent [19]
Buschmann

[11] Patent Number: 5,312,169
[45] Date of Patent: May 17, 1994

[54] CIRCUIT CONFIGURATION FOR AN AUTOMOTIVE VEHICLE WITH ANTI-LOCK CONTROL AND/OR TRACTION SLIP CONTROL

[75] Inventor: Gunther Buschmann, Griesheim, Fed. Rep. of Germany

[73] Assignee: Alfred Teves GmbH, Fed. Rep. of Germany

[21] Appl. No.: 990,983

[22] Filed: Dec. 16, 1992

Related U.S. Application Data

[63] Continuation of Ser. No. 673,431, Mar. 22, 1991, abandoned.

[30] Foreign Application Priority Data

Mar. 23, 1990 [DE] Fed. Rep. of Germany ....... 4009355

[51] Int. Cl.$^5$ .......................... B60T 8/32; B60T 8/60;
B60T 17/00; G01P 3/00
[52] U.S. Cl. ...................................... 303/100; 180/79;
180/197; 303/92; 303/103; 303/113.2;
364/426.02; 364/426.03; 364/449
[58] Field of Search ................. 303/100, 102, 103, 91,
303/20, 92, 105, 110, 93, 111, 95, 96, 99, 109,
104-108, 113.2, 113.3, 113.1; 188/181 A, 181 T,
181 C, 181 R; 364/449, 453, 454, 457, 426.01,
426.02, 426.03, 426.04, 559, 444, 450, 456;
180/197, 79, 140

[56] References Cited

U.S. PATENT DOCUMENTS

| 3,810,681 | 5/1974 | Matty | 303/20 |
|---|---|---|---|
| 4,336,858 | 6/1982 | Loyzim | 303/109 X |
| 4,458,775 | 7/1984 | Lestradet | 180/79 |
| 4,779,202 | 10/1988 | Leiber | 303/100 X |
| 4,898,431 | 2/1990 | Karnopp et al. | 303/110 X |
| 4,926,954 | 5/1990 | Ataka et al. | 180/140 |
| 4,982,332 | 1/1991 | Saito et al. | 364/449 |
| 5,021,962 | 6/1991 | Helldörfer et al. | 364/457 |
| 5,023,798 | 6/1991 | Neukirchner et al. | 364/449 |
| 5,029,949 | 7/1991 | Buschmann et al. | 303/100 |
| 5,046,011 | 9/1991 | Kakihara et al. | 364/450 X |
| 5,058,699 | 10/1991 | Fennel et al. | 303/110 X |
| 5,060,159 | 10/1991 | Fennel | 364/426.02 |
| 5,090,231 | 2/1992 | Gallagher | 364/559 X |

FOREIGN PATENT DOCUMENTS

| 2009489 | 9/1971 | Fed. Rep. of Germany . | |
|---|---|---|---|
| 2130348 | 11/1972 | France . | |
| 2509243 | 1/1983 | France . | |
| 0138211 | 10/1979 | Japan | 364/449 |
| 1342789 | 10/1987 | U.S.S.R. | 303/100 |
| 1383553 | 2/1975 | United Kingdom . | |
| 2109882 | 6/1983 | United Kingdom . | |
| 2219056A | 11/1989 | United Kingdom . | |

OTHER PUBLICATIONS

"The World Book Encyclopedia", 50th Ed., vol. 4, pp. 734-735 (1966).

Primary Examiner—Douglas C. Butler
Attorney, Agent, or Firm—J. Gordon Lewis; Robert P. Seitter

[57] ABSTRACT

A circuit configuration for an automotive vehicle with anti-lock control and/or traction slip control is equipped with wheel sensors (S1-S4), with circuits for handling and evaluating the sensors signals (respectively 1 and 2-4) and for generating braking pressure control signals and/or traction torque control signals. Further, a compass or compass system (7) is provided whose output signals are feedable to the evaluation circuits (4) and evaluatable for improving control, for identifying cornering, for assessing the driving stability etc. or also for monitoring proper operation.

16 Claims, 1 Drawing Sheet

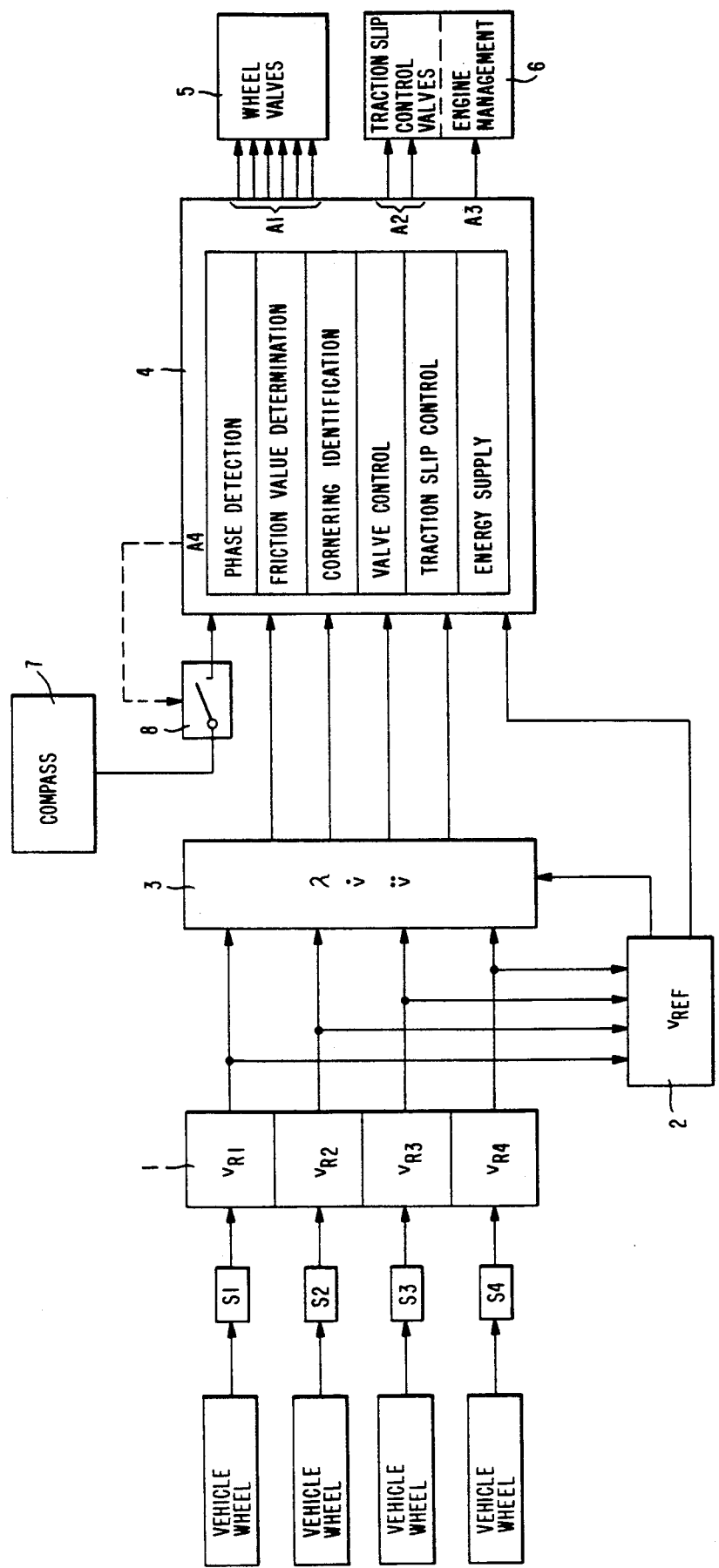

CIRCUIT CONFIGURATION FOR AN AUTOMOTIVE VEHICLE WITH ANTI-LOCK CONTROL AND/OR TRACTION SLIP CONTROL

This application is a continuation of application Ser. No. 07/673,431 filed Mar. 22, 1991 now abandoned.

This invention relates to a circuit configuration for an automotive vehicle with anti-lock control and traction slip control. In particular, this invention relates to a circuit configuration for an automotive vehicle having an instantaneous positional orientation and having vehicle wheels, and having an operator controlled drivetrain including a prime mover drivingly engaging at least one of the vehicle wheels and a brake system operative to selectively retard rotation of at least one of the vehicle wheels.

BACKGROUND OF THE INVENTION

Wheel sensors are the main sources for the information needed for control in the known electronic control system for anti-lock control and traction slip control that are available on the market. The rotational behaviour of the individual wheels is measured by means of these sensors and the vehicle speed, or rather the reference speed of the vehicle, is derived from these measured values. By linking the signals it is moreover possible to detect to a more or less reliable extent whether the vehicle momentarily is driving straight onwards or is cornering, whether the friction coefficient is high or low, whether there is a danger of high yawing moments etc.

It is likewise known to use vehicle acceleration sensors. Other control systems additionally require braking pressure sensors.

For cost reasons, one aim is to get along with as few sensors as possible. On the other hand, there is a need for further information on the momentary behaviour of the vehicle in order to improve control, to exclude misinterpretation of the sensor information and to detect errors, or rather defects, in time.

BRIEF DESCRIPTION OF THE INVENTION

It is thus a general object of this invention to disclose a circuit configuration which, in a highly reliable manner, adapts anti-lock control and/or traction slip control to the various conditions with an even higher degree of accuracy and which also excludes misinterpretation of the sensor signals in critical situations in which the sensor signals are ambiguous.

It now has been found out that this object can be solved with a circuit configuration of the type referred to at the beginning whose special feature consists in that a compass or a compass system is provided whose output signals are feedable to the evaluation circuits and are evaluatable for improving control, in particular for improving accuracy and behaviour of control in critical situations.

According to advantageous examples of embodiments of this invention, the output signals of the compass and the information gathered by the sensor signals are evaluatable in the evaluation circuits for identifying cornering and for accessing driving stability. Alteratively, the output signals of the compass are evaluatable in the evaluation circuits for identifying misinformation and faulty control caused by defects, ambiguous sensor information and the like. Alteratively, the evaluation circuits and the compass are only interconnected during predetermined operating conditions during which control by the compass is critical and during which the information gathered by the wheel sensors is ambiguous.

According to this invention, in a circuit configuration of this type, it is also possible to use the compass system exclusively for monitoring control, or rather the proper evaluation of the sensor signals, and for triggering warning signals or a cut-off of control in case of trouble.

Further characteristics, advantages and applications of this invention will become evident from the following description of an example of an embodiment of this invention.

BRIEF DESCRIPTION OF THE DRAWING

The sole drawing Figure which, in the form of a (functional) block diagram, represents the main assembly units and components of a circuit configuration according to this invention.

DETAILED DESCRIPTION OF THE INVENTION

According to the drawing figure which represents an example of one embodiment of the present invention, each wheel of an automotive vehicle is equipped with a wheel sensor S1–S4. In a signal processing circuit or trigger circuit 1, the output signals of the individual sensors are processed so that, finally, there is available a signal $V_R1$–$V_R4$ which corresponds to the angular velocity of the individual wheels and which can be subjected to further electronic processing. In a stage 2, a reference velocity of the vehicle $V_{REF}$ is derived from these velocity signals in accordance with known algorithms, said reference velocity of the vehicle $V_{REF}$ approximately corresponding to the speed of the vehicle. For instance, in some phases of control, the reference velocity of the vehicle corresponds to the speed of the fastest wheel.

Further, the first derivative $\dot{v}$, as a function of time, of the individual wheel velocities—that is the wheel acceleration or wheel deceleration—and the second derivative $\ddot{v}$ as a function of time, namely the so-called jolt, are formed in a circuit block 3. By comparing the individual wheel velocities with the reference velocity it is possible to determine the wheel slip t.

The signals formed in stages 2 and 3 are logically linked and evaluated in evaluation circuits 4. Eventually, braking pressure control signals are available at the outputs A1 of said circuits 4. Said braking pressure control signals are passed on to wheel valves 5 and control the braking pressure in the wheel brake cylinders by actuating said wheel valves. Generally, one pair of inlet and outlet valves is provided per control channel. By means of said valve pair it is possible to keep the braking pressure in the controlled wheels constant to reduce it and to reincrease it depending on the result of the signal evaluation in the circuits 4.

In the example of an embodiment represented here, further, so-called ASR valves 6 (ASR=traction slip control) are connected to the outputs A2. In case of excessive traction slip they will come into operation and prevent the wheels from spinning. The signal of an output A3, finally, leads to an engine management system likewise belonging to traction slip control. By controlling, or rather by reducing the torque of the engine of the automotive vehicle it is possible in a known manner to counter act the spinning tendency of a driven wheel.

Stage 4 symbolizes the entirety of evaluation circuits. By means of the individual blocks within stage 4 it is suggested that it is possible to subdivide the same again into different functional blocks. The entire circuitry 4, however, also can be realized by one or by a plurality of program-controlled circuits such as microprocessors or microcomputers. The circuit blocks sketched out represent but some of the functional blocks actually needed or used.

According to this invention, in addition, a compass or a compass system 7 is provided whose output signals are likewise taken into consideration in the evaluation of the sensor signals derived from the wheel sensors S1–S4 and gained by means of stages 2 and 3 in the described manner.

In the example of an embodiment represented here, the output signals of compass 7 are supplied to the evaluation circuitry via a switch 8. Said switch 8 will only be closed via a signal line, connected to an output A4 of the evaluation circuitry 4, if - in critical situations in which the sensor signals are not unambiguous the information supplied by compass 7 is additionally to be made use of In other examples of embodiments, compass 7 is permanently connected, for instance, in order to detect independently of the signals of wheel sensors S1–S4 whether the vehicle is driving straight onwards or whether it is in the actual process of cornering. The different speeds of the wheels on the inside and on the outside of the bend can directly be taken into consideration when evaluating the signals and braking pressure control such as in calculating the reference velocity of the vehicle.

An identification of cornering may also be performed in a known manner by comparing the signals supplied by wheel sensors S1–S4. As long as the wheel slips are approximatively the same a criterion in this process will be the different speeds of the wheels of one axle. In this case, compass 7 can be used for checking or monitoring the sensors. If the information supplied by compass 7 and the sensors S1–S4 is contradictory this will be an indication of an error, therefore a warning signal being triggered via a device not illustrated here and, if necessary, the entire anti-lock control system or traction slip control system being switched off.

On the other hand, it is also possible to simplify the evaluation of the signals supplied by wheel sensors S1–S4 or even to reduce the number of wheel sensors and to include the statements of compass 7, or rather of the output signal of this stage, into the signal processing by circuits 4 instead. There are numerous ways possible either to achieve a simplification in evaluation logic or to compare redundant information with other such information, to detect errors and thus to enhance operational reliability of the controller circuitry.

I claim:

1. A circuit configuration for an automotive vehicle having vehicle wheels each having a rotational behavior with anti-lock control and traction slip control, including sensors for gathering information on the rotational behavior of the vehicle wheels and on driving behavior of the vehicle, and evaluation circuits for receiving and evaluating the information and for generating braking pressure control signals and traction torque control signals, characterized int hat said configuration further comprises a compass operative to generate output signals to the evaluation circuits to effect control of said rotational and driving behavior as a function thereof.

2. A circuit configuration as claimed in claim 1, characterized in that the output signals f the compass and the information gathered by the sensors are evaluatable in said evaluation circuits for identifying cornering of said automotive vehicle and for accessing driver stability.

3. A circuit configuration as claimed in claim 1, characterized in that the output signals of the compass are evaluatable in said evaluation circuits for identifying misinformation and defects and ambiguous sensor information.

4. A circuit configuration as claimed in claim 1, characterized in that the circuit configuration further includes interconnection means for interconnecting the evaluation circuits and the compass only during operating conditions of said circuit configuration during which control from said compass is critical and during which the information gathered by the wheel sensors is ambiguous.

5. A circuit configuration for an automotive vehicle having vehicle wheels each having a rotational behavior with anti-lock control and traction slip control, including sensors for gathering information on the rotational behavior of the vehicle wheels and on driving behavior of the vehicle, and evaluation circuits for receiving and evaluating the information and for generating braking pressure control signals and traction torque control signals, characterized int hat said configuration further comprises a compass operative to generate output signals to the evaluation circuits to effect control of said rotational and driving behavior as a function thereof and said evaluation circuits include means for triggering warning signals and control cut-off signals in response to a contradictory relation between the information gathered by the sensors and the output signals generated by the compass.

6. A control system for an automotive vehicle having an instantaneous positional orientation and having ground engaging vehicle wheels each having a rotational behavior, said control system comprising:
   a plurality of sensors operative to monitor the rotational behavior of the ground engaging vehicle wheels and generate output signals as a function thereof;
   compass means operative to monitor the instantaneous positional orientation of said automotive vehicle and generate a positions signal as a function thereof; and
   logic means operative to receive said output and position signals and to generate control signals in response thereto tot effect modification of vehicle wheel dynamics by at least partially overriding operator control of an associated vehicle drive train.

7. The system of claim 6 wherein said vehicle drive train comprises a prime mover drivingly engaging at lest one of said wheels and a brake system operative to selectively retard rotation of at least one of said wheels.

8. The system of claim 6, wherein said logic means is operative to effect anti-lock control of at least some of said wheels.

9. The system of claim 6, wherein said logic means is operative to effect traction slip control of at least one of said wheels.

10. The system of claim 6, wherein said logic means is permanently connected to said compass means for identifying cornering independently of the output signals generated by said plurality of sensors.

11. A control system for an automotive vehicle having an instantaneous positional orientation and having vehicle wheels each having a rotational behavior and having an operator controlled drivetrain including a prim mover drivingly engaging at least one of said vehicle wheels and including a brake system operative to selectively retard rotation of at least one of said vehicle wheels, said brake system including wheel valves interconnected with a brake actuating device and a wheel brake, said control system for controlling the rotational behavior of the ground engaging wheels and comprising:
   a plurality of wheel sensors, each operative to monitor the rotational behavior of one of said vehicle wheels and to generate a discrete output signal as a function thereof;
   a compass operative to monitor the instantaneous positional orientation of said automotive vehicle and generate a position signal as a function thereof; and
   a logic circuit operative to receive said output and position signals, to calculate certain operating parameters including wheel accelerating, wheel jolt, wheel slip and vehicle velocity as a function of said output signals, to compare said operating parameters with preestablished set-limits for indicating whether anti-lock an traction slip control is required, to generate control signals when said parameters vary from said set-limits, and to deliver said control signals to said speed control system and hydraulic valves to effect anti-lock and traction slip control of said automotive vehicle.

12. The system of claim 11, wherein said logic circuit is further operative to compare said operating parameters with said position signal and to generate a system fault signal as a function thereof.

13. The system of claim 11, further comprising switch means operative to selectively decouple said compass from said logic circuit whenever said output signals are unambiguous.

14. An anti-lock and traction slip control system for an automotive vehicle having a instantaneous positional orientation and having vehicle wheels each having a rotational behavior, said control system comprising:
   a plurality of wheel sensors for monitoring the rotational behavior of the vehicle wheels and for generating sensor signals representative of the rotational behavior;
   compass means for monitoring the instantaneous positional orientation of the automotive vehicle and for generating position signals representative of the positional orientation of the automotive vehicle;
   signal processing means, responsive to said sensor signals and said position signals, for:
      (a) identifying cornering of said automotive vehicle and at least one of:
         (1) an imminent wheel lock condition, and
         (2) a traction slip condition,
      (b) distinguishing between sensor signals generated due to cornering and sensor signals generated due to at least one of:
         (1) an imminent wheel lock condition, and
         (2) a traction slip condition, and
      (c) generating control signals representative of at least one of:
         (1) an imminent wheel lock condition, and
         (2) a traction slip condition; and
   means, responsive to said control signals, for controlling the rotational behavior of said vehicle wheels to effect at lest one of anti-lock control and traction slip control of said automotive vehicle.

15. A control system in accordance with claim 14, wherein said signal processing means include:
   first evaluation circuit means, responsive to said position signals, for identifying cornering of said automotive vehicle and for generating cornering signals;
   second evaluation circuit means, responsive to said sensor signal, for identifying conditions of wheel rotational behavior during which said sensor signals are ambiguous and for generating condition signals; and
   third evaluation circuit means, responsive to said cornering signals and said condition signals, for:
      (a) distinguishing between sensor signal generated due to cornering and sensor signals generated due to at least one of:
         (1) an imminent wheel lock condition, and
         (2) a traction slip condition, and
      (b) generating control signals representative of at least one of:
         (1) an imminent wheel lock condition,
         (2) a traction slip condition.

16. An anti-lock and traction slip control system for an automotive vehicle having an instantaneous positional orientation and having vehicle wheels each having a rotational behavior, said control system comprising:
   a plurality of wheel sensors for monitoring the rotational behavior of the vehicle wheels and for generating sensor signals representative of the rotational behavior;
   compass means for monitoring the instantaneous positional orientation of the automotive vehicle and for generating positions signals representative of the positional orientation of the automotive vehicle;
   first signal processing means, responsive to said sensor signals, for identifying cornering;
   second signal processing means, responsive to said sensor signals and said position signals, for;
      (a) identifying cornering of said automotive vehicle independently of said first signal processing means,
      (b) identifying at least one of:
         (1) an imminent wheel lock condition, and
         (2) a traction slip condition,
      (c) distinguishing between sensor signals generated due to cornering and sensor signals generated due to at least one of:
         (1) an imminent wheel lock condition, and
         (2) a traction slip condition,
      (d) generating control signals representative of at least one of:
         (1) an imminent wheel lock condition, and
         (2) a traction slip condition,
   means, responsive to said control signals, for controlling the rotational behavior of said vehicle wheels to effect at least one of anti-lock control and traction slip control of said automotive vehicle.

* * * * *

UNITED STATES PATENT AND TRADEMARK OFFICE
CERTIFICATE OF CORRECTION

PATENT NO. : 5,312,169
DATED : May 17, 1994
INVENTOR(S) : Gunther Buschmann

Page 1 of 2

It is certified that error appears in the above-indentified patent and that said Letters Patent is hereby corrected as shown below:

In claim 1, column 3, line 64, delete "int hat" and substitute therefor --in that--

In claim 2, column 4, line 2, delete "f" after the word "signals" and substitute therefor --of--

In claim 5, column 4, line 27, delete "int hat" and substitute therefor --in that--

In claim 6, column 4, line 51, delete "tot" and substitute therefor --to--

In claim 15, column 6, line 14, delete "signal" and substitute therefor --signals--

In claim 15, column 6, line 20, delete "signal" and substitute therefor --signals--

In claim 16, column 6, line 56, add --and-- after "condition,"

UNITED STATES PATENT AND TRADEMARK OFFICE
CERTIFICATE OF CORRECTION

PATENT NO. : 5,312,169

DATED : May 17, 1994

INVENTOR(S) : Gunther Buschmann

It is certified that error appears in the above-indentified patent and that said Letters Patent is hereby corrected as shown below:

In claim 16, column 6, line 60, delete the comma "," after "condition" and substitute therefor —; and—.

Signed and Sealed this

Twenty-fifth Day of October, 1994

Attest:

BRUCE LEHMAN

Attesting Officer

Commissioner of Patents and Trademarks